Oct. 3, 1950          G. VON MIGULA          2,524,413
                         ENGINE MOUNT
Filed July 23, 1945                    3 Sheets-Sheet 1
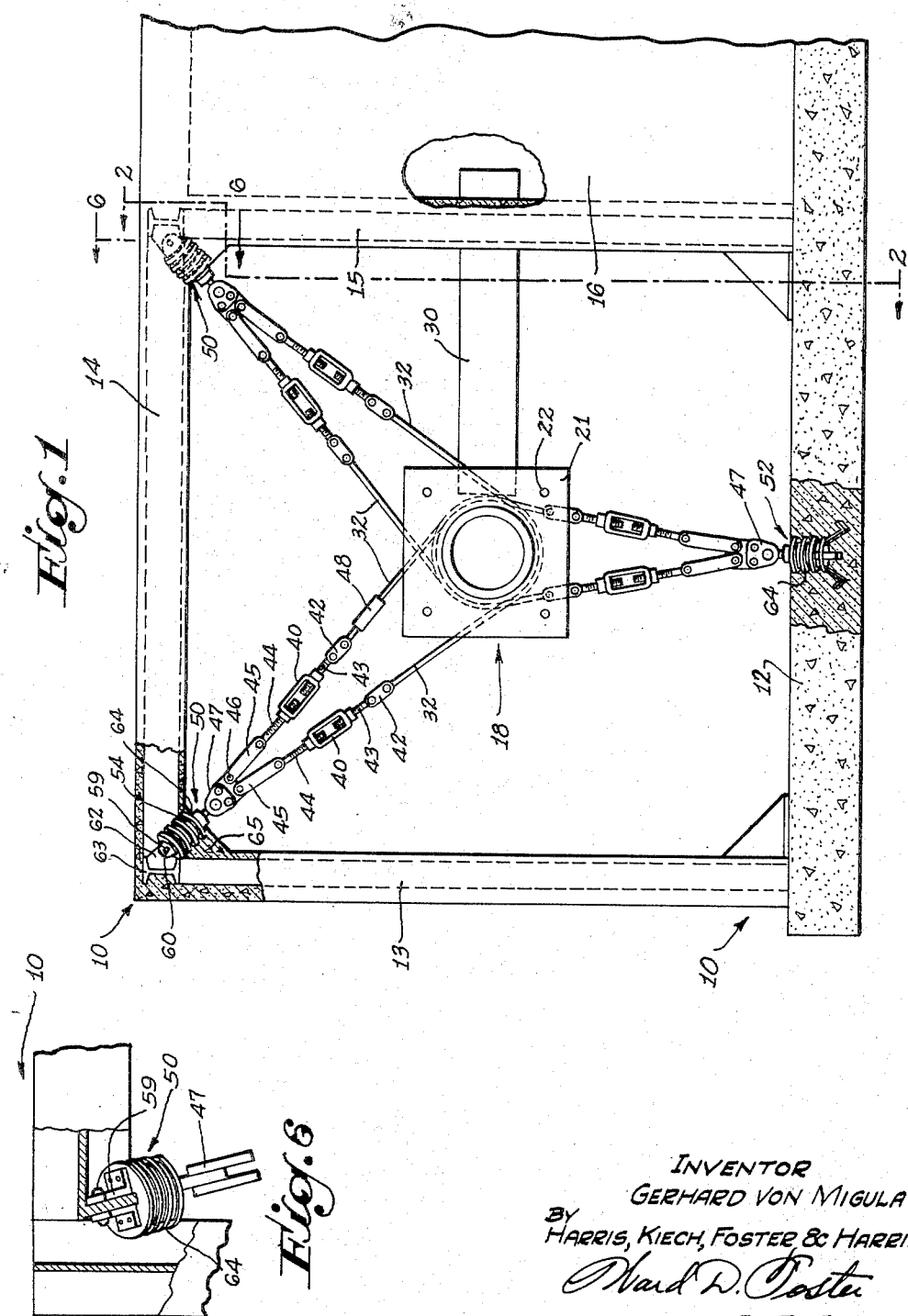
INVENTOR
GERHARD VON MIGULA
BY
HARRIS, KIECH, FOSTER & HARRIS
Ward D. Foster
FOR THE FIRM
ATTORNEYS

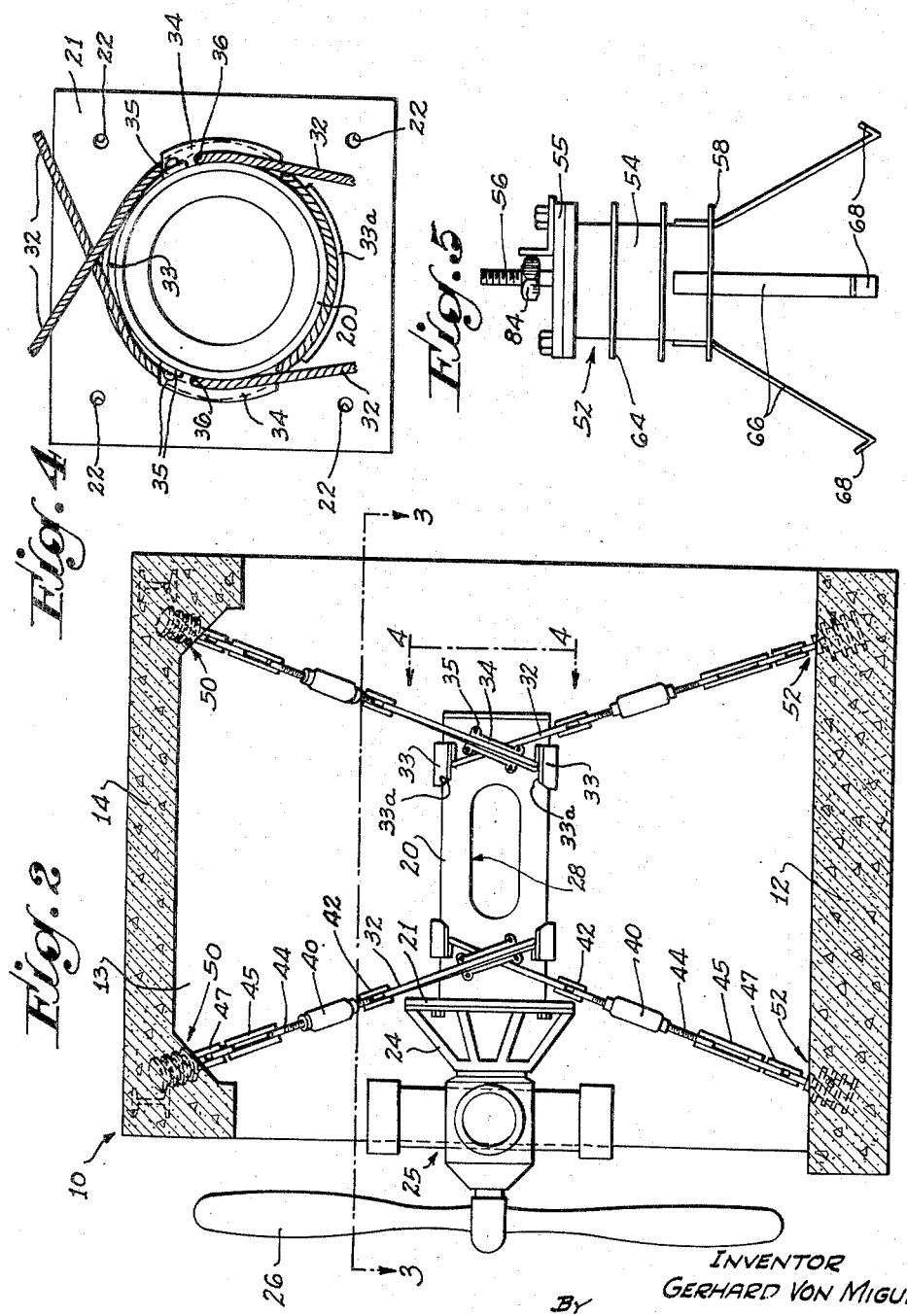

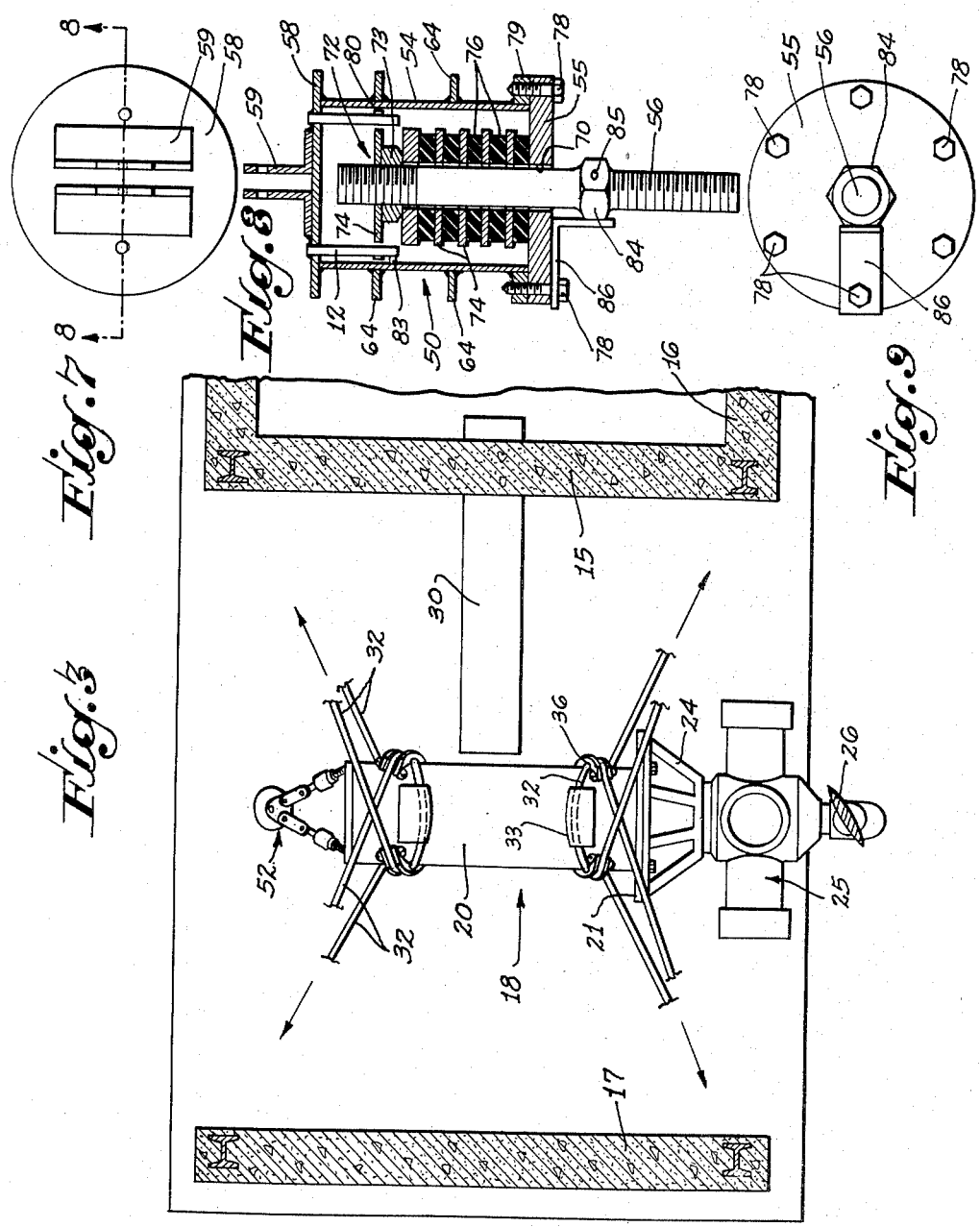

Patented Oct. 3, 1950

2,524,413

UNITED STATES PATENT OFFICE 2,524,413

ENGINE MOUNT

Gerhard Von Migula, Flintridge, Calif., assignor to Pacific Airmotive Corporation, North Hollywood, Calif., a corporation of California Application July 23, 1945, Serial No. 606,604

6 Claims. (Cl. 248—17)

This invention relates to test stands or test mountings wherein airplane engines are tested before being finally installed in airplanes in which they are to be used.

The principal object of this invention is to provide test devices in which engines will be mounted so as to protect them from damage and to simulate as fully as possible the actual operating conditions which are encountered in actual use. A further object of the invention is to produce test devices for airplane engines which may be relatively simple in construction and yet strong and durable in service.

A further object of the invention is to provide test means by which the most accurate determination of the inherent practical abilities of an engine may be determined, without injecting into the test such factors as would impose unreasonable conditions or conditions which are not actually encountered in practice.

In test stands which have been employed heretofore, carriers to which the airplane engines have been attached during test have been rigidly braced against rigid supporting structures in order to eliminate as completely as possible vibration which is produced by the motor.

It has been found, however, that this rigidity injects a condition which is not found in actual flight practice and as a result introduces into the test artificial conditions which not only are not representative of natural conditions but impose serious operating strains that unduly affect the engines and engine operation, as well as interfere with propeller functioning. As a result of the introduction of these artificial conditions, test results do not truly represent the characteristics of the engines tested and at the same time produce at least a limited amount of permanent injury.

In order to overcome the disadvantages of the artificial situations encountered in rigidly braced test stands, and to make it possible to obtain test conditions representing actual operating conditions as closely as possible, I have devised a means for supporting carriers and test stands for airplane engines which will permit vibrational conditions closely simulating natural conditions. This has been accomplished by suspending a tubular engine carrier on flexible cables which serve as the sole means for suspending and properly positioning and anchoring the carrier. The desired results are produced by attaching a plurality of cables, at least three, to each end of the tubular carrier, extending these cables radially outward for supporting and anchoring purposes, much as heretofore, and at the same time extending sets of cables at the two ends of the device respectively forward and rearward at angles sufficiently steep to resist propeller pull and to produce opposing tensions by the two sets of cables whereby to restrain the carrier against appreciable longitudinal movement, either forward or rearward. By properly tensioning the cables and anchoring their outer ends in a suitable rigid supporting structure, only that amount of movement of the engine carrier is permitted which corresponds with the natural vibrational conditions existing in aircraft in flight. According to a preferred construction, and in order to best simulate actual operating conditions in flight of craft upon which the particular type of engine is to be installed, suitable shock absorbers of heavy construction are interposed between the cables and the actual point of attachment to the mentioned rigid supporting structures. For example, heavy rubber cushioning bodies in appropriate housings are interposed as appropriate shock absorbing elements which prevent transmission of undue vibration to the supporting structure and at the same time permit desired vibrational effects in the engine being tested and in its carrier. In actual practice, the amount of vibration of the cables supporting the carrier is sufficient in some directions to be observable by the naked eye. Employment of steel cables in looped form whose bights are passed around the respective ends of the tubular carrier, in conjunction with the heavy shock absorbers mentioned, together with suitable tensioning means such as heavy turnbuckles, provides adequate suspending and positioning means whereby the carrier and the supported engine being tested are floated in the rigid supporting structure in such manner as to provide for the required vibrational conditions. Such a floating mounting permits a limited bodily movement in three dimensions of the mounting and engine under influence of the high speed operation of the propeller carried by the engine. Also, the use of appropriate strain gauges or tension indicators interposed in certain of the cable lengths may be used for determination of tensioning conditions and to facilitate the operator's control of test conditions.

Other features and objects of the invention will become apparent to those skilled in the art upon reference to the following specification and the accompanying drawings wherein one embodiment of the invention is disclosed for the purpose of illustration.

In the drawings,

Fig. 1 is a front elevation of an engine testing mounting or test stand of the present invention, prior to attachment of an airplane engine and its standard mount, parts being shown in section;

Fig. 2 is principally a side elevation of the test mounting of Fig. 1, showing an airplane engine mounted in test position, parts being shown in section as indicated by the line 2—2 of Fig. 1;

Fig. 3 is a plan view, taken approximately from the line 3—3 of Fig. 2, certain parts being shown in cross section;

Fig. 4 is a rear end elevation, as indicated by the line 4—4 of Fig. 2;

Fig. 5 is a side elevation of a bottom cable-anchor and shock absorber seen in Fig. 1;

Fig. 6 is a fragmentary view, partly in elevation and partly in section, as indicated in general by the line 6—6 of Fig. 1, to illustrate a top anchor and shock absorber, portions being broken away to facilitate disclosure;

Fig. 7 is a top plan view of a top anchoring device such as indicated in Fig. 6;

Fig. 8 is a vertical section taken through a top anchor, as indicated by the line 8—8 of Fig. 7, the internal construction shown being substantially that of the bottom anchor of Fig. 5; and Fig. 9 is a bottom plan of the top anchor of Figs. 6, 7, and 8, and corresponds also with the top plan of the bottom anchor of Fig. 5.

In these drawings, a rigid supporting structure 10 for the test mounting is shown as comprising a heavy concrete floor 12, which may be suitably reinforced if required, an outer side wall 13, a top wall 14, and an inner side wall 15 which serves also as one wall of a control house 16. The floor 12, the side walls 13 and 15, and the top wall 14 thus constitute a wind tunnel in which is disposed the test stand or test engine mounting 18. The mounting 18 in the form shown comprises an elongated tubular carrier 20 to the forward end of which there is secured a bolting plate 21 provided with suitable bolt holes 22 (Fig. 1) for the attachment of a standard engine mount 24 (Figs. 2 and 3) which carries an airplane engine 25 and its propeller 26. According to conventional practice, the elongated carrier 20 is provided on one side with an access opening 28 which is in line with a housing 30 which leads from within the control house 16 for the purpose of housing electric conduits, fuel supply tubes, control devices, and test indicator connections leading to the engine 25.

An important feature of the present invention is found in the location and mounting of a plurality of tensioned positioning cables 32. As shown, a set of three cables 32 is attached to each end of the tubular carrier 20, each cable 32 being looped and passed around the tube 20. The cables 32 of each set are directed radially outward from the carrier 20 and at an angle thereto in a direction longitudinally away from the respective end of the carrier 20. In this manner, one set of cables 32 imparts a longitudinal pull to the carrier 20 which is opposite in direction to a corresponding pull of the other set of cables 32. Thus, the radial disposition of the cables 32 of each set serves to position the carrier 20 centrally of the wind tunnel formed between the walls 13 and 15 and to cause the whole test mounting and an engine 25 attached thereto to float spherically in the wind tunnel. By reason of the disposition of the ends of the cables 32 of each set respectively, fore and aft in opposing directions with respect to the longitudinal axis of the carrier 20, the whole test assembly is held against substantial movement.

For the purpose of mounting each of the looped cables 32 upon the tubular carrier 20, saddles 33 are provided, there being a set of three saddles for each set of three cables. Each saddle 33, in the form shown, is a metal body curved to the shape of the cylindrical surface of the carrier 20 and is undercut to provide a lip 33a overhanging the respective cable or cables 32 and to provide thereunder a curved seat against which the respective cable 32 is drawn, the curvature of each seat serving to direct the ends of the cables toward their points of attachment. Conveniently, each saddle 33 is secured to the carrier 20 by welding.

In view of the radial arrangement of the saddles 33 of each set as shown, certain of the looped cables 33 must cross over others. Thus, the strand of each upper looped cable passing from one side of the carrier 20 to the remote side of the rigid supporting structure 10 is required to pass over the adjacent strand of that looped cable of the same set which is anchored in the floor 12. For this purpose, a bridge 34 is positioned over the underlying cable strand, each end of each bridge 34 being secured at 35 to the carrier 20 and being provided on its under side with a passage 36 (Fig. 4) through which the underlying cable extends. In the form shown, each bridge 34 is channel shaped to provide side walls which suitably retain the overlying cable strand, the bottom of the channel being suitably curved and shaped for the purpose.

Each of the cables 32 is provided with tensioning means and in the construction shown such tensioning means is in the form of a turnbuckle 40 secured to each end of the loop of each cable 32. For the purpose of attachment of the cable ends, any appropriate connection 42 is employed, to one end of which the respective cable end is secured and to the other end of which one threaded bolt 43 of the turnbuckle 40 is connected. A threaded bolt 44 at the other end of each turnbuckle 40 is appropriately secured to a link 45, and the respective links 45 are pivotally connected at 46 to anchoring shackles 47. If desired, a strain gauge 48 may be connected with one or more of the cables 32, such as an upper cable, whereby strains imposed on the system during testing operations may be automatically measured.

According to the preferred construction illustrated in the drawings, two of each set of three looped cables 32 are arranged as upper suspending cables whereby the weight of the test assembly is supported, these cables being directed into the upper corners of the rigid supporting structure 10. The third looped cable 32 of each set extends downward to the floor 12 and serves as a restraining cable. The upper shackles 47, to which the suspending cables 32 are secured, are in turn connected with upper anchors 50 secured in the mentioned upper corners of the supporting structure 10, the shackle 47 of the lower restraining cable 32 being secured to a lower anchor 52 imbedded in the concrete floor 12.

The construction of the upper anchors 50 and the lower anchor 52 is substantially the same. Each of them, as shown in Figs. 5 and 8, is provided with a cylindrical housing 54 to one end of which is attached an outer head 55 through which a connecting rod 56 freely extends, and to the other end of which is permanently secured an inner head 58, the outer ends of the rods 56 being secured to the respective shackles 47. In the case of the upper anchors 50, the inner head 58 is provided with apertured ears 59 which are secured as by means of a connecting pin 60 to a bracket plate 62 welded to a respective I-beam 63 located in the upper corners of the rigid supporting structure 10 and forming an important part thereof. In addition, each of the cylindrical housings 54 is provided with a series of annular ribs 64 which, together with the overhanging edge of the inner head 58, serve as additional anchoring means adapted to be imbedded in concrete. In the case of the upper anchors 50 such imbedding concrete provides filled-in corners 65 of the supporting structure 10, while in the case of the lower anchors 52 the annular ribs 64 constitute a principal means for imbedding the anchor in the concrete floor 12. In lieu of the attachment provided by the ears 59 of the upper anchors 50, each lower anchor 52, as shown in Fig. 5, is provided with a plurality of tie straps 66 whose upper ends project through the rim of the permanent head 58 and are welded to the side walls of the cylindrical housing 54. The lower portions of the straps 66 are inclined outward to provide additional retaining value and are further provided with reversed bends 68 that serve as positive concrete-engaging detents.

The anchoring devices 50 and 52, in addition to serving as means for anchoring the ends of the non-rigid supporting and positioning means afforded by the looped cables 32 and the connecting parts on their ends, serve also to provide shock-absorbing means by which to prevent the transmission of much of the vibration of the testing apparatus to the supporting structure 10. For this purpose, the inner end of the connecting rod 56 projects freely through an aperture 70 in the outer head 55 into the interior of the cylinder 54 where the rod 56 is secured as by means of threading, welding, or the like, to a plunger-like member 72 which may include a large bearing nut 73 in turn welded to a guide plate 74 and snugly contacting a thrust plate 75. Between the outer head 55 and the thrust plate 75 and disposed around the inner end of the rod 56, there is a series of rubber shock-absorbing blocks 76 which alternate with a series of washers or spacer plates 77. These parts are adapted to be installed in the cylindrical housing 54 and removed therefrom when desired by detachably mounting the outer head 55 with bolts or screws 78 which pass through the head 55 into retaining engagement with a ring 79 welded to the outer wall of the adjacent end of the housing 54.

In order to prevent rotation of the guide plate 74 and the bearing nut 73, with respect to either the connecting rod 56 or the cylindrical housing 54, the plate 74 is provided with diametrically opposed notches 80 which receive correspondingly positioned guide rods 82 appropriately anchored in the inner head 58 as shown and also to the side walls of the housing 54 as at 83, if required. Thus, the guide pins permit limited reciprocation of the plate 74 within the housing 54 and prevent the plate 74 from rotating. Inasmuch as the connecting rod 56 may be mounted in the guide plate 74 and bearing nut 73 solely by threading, and may also be connected with the corresponding shackle 47 only by threads on its outer end, means is provided for rotating the rod 56 and for preventing rotation thereof which is in the form of a nut 84 threaded thereon to the position indicated in Figs. 5 and 8, and permanently secured in such position as by welding or by a pin 85, or both. To maintain the rod 56 in set position, an angular retainer 86 may be employed which is moved into engagement with one of the flat faces of the nut 84 and bound in such retaining position as by means of one of the bolts or screws 78 which holds the outer head 55.

Operation

To employ the test stand of this invention, the tubular carrier 20 is suspended in its floating position by means of the upper cables 32 whose loops are seated in the saddles 33, the rear set of upper cables 32 being directed radially and laterally outward and secured to the respective upper anchors 50, and the corresponding lower cable 32 being directed radially downward and laterally outward and secured to the respective lower anchor 52. Similarly, the forward set of upper and lower cables 32 is mounted upon the forward end of the tubular carrier 20, their ends being likewise secured to the respective upper anchors 50 and lower anchor 52. The various upper anchors 50 and lower anchor 52 being arranged at the corners of the rigid supporting structure 10 and in such relation with respect to the seating of the looped cables 32 in their saddles 33 that the anchor points of each cable are disposed respectively fore and aft or longitudinally of the axis of the carrier 20, opposing pulling forces respectively forward and rearward are imposed upon the ends of the tubular carrier 20. The non-rigid mounting thus provided by the flexible cables 32 being the only suspending and positioning means for the test assembly, the resultant floating mounting thereby provides for the vibration in the test assembly required for protecting the motor from damage and to simulate actual practical conditions of flight.

The desired tension on the various cables 32 to provide the respective conditions required for any given engine being tested is readily accomplished through the medium of the various turnbuckles 40 which may be adjusted to draw up slack in the strands of the cables 32 according to conditions. A turnbuckle 40 is provided in each strand of each looped cable 32 because of the fact that the bights of the cables 32 will not slip on their seats in their respective saddles 33. Both for the purpose of absorbing vibration so that only inconsequential amounts thereof will be imparted to the rigid supporting structure 10, and in order to provide a limited amount of resilience in the connection of each cable 32 to the tubular engine carrier 20, the rubber shock-absorbing blocks 76 are employed in the various anchors 50 and 52, as illustrated in Fig. 8.

Having adjusted the turnbuckles 40 to accomplish the desired tension for any given test condition, and having attached an airplane engine 25 and its propeller 26 to the bolting plate 21 on the carrier 20 by means of the standard engine mount 24, the assembly is in form for test. During actual testing operations, conditions are normally such that the draft of the propeller 26 shifts the test assembly forward slightly from its normal inactive condition, and the tensioned condition of the cables 32 is such as to produce therein by reason of the engine operation a vibratory movement sometimes noticeable to the naked eye.

As a result of the employment of the floating test mount of this invention, unreasonable artificial strains which would be imposed on engines undergoing test when carried on rigid test mounts are entirely eliminated. The test is made under conditions which closely parallel the actual operating conditions of airplane engines installed in craft in flight, because such flight conditions are well simulated by the conditions of vibration provided by the present improved arrangement, construction, and manner of mounting and tensioning.

By reason of the disposition of the anchors 50 and 52 at positions respectively fore and aft of the points of attachment of the cables 32 to the carrier 20 in the seats of the saddles 33, the restraining of the carrier 20 against substantial longitudinal movement due to propeller pull during tests is made possible without the necessity for relying upon any form of rigid bracing means. Thus, this disposition of the forward and rearward sets of cables 32 makes it possible not only to suspend the carrier 20 from the ceiling and to anchor it to the floor, but makes it also possible to prevent the mentioned longitudinal movement without any other means, and thereby affords at the same time means providing the necessary vibrational conditions, as herein explained. Also, due to angularity of the cables 32, vibration will be in three dimensions or spherically.

Various modifications of the specific apparatus herein disclosed whereby the same results may be accomplished doubtless will become apparent to those skilled in the art. It is intended, therefore, to protect by the following claims all such variations and modifications of the disclosed structure and method of operation as fall within their scope.

I claim as my invention:

1. A motor mount comprising in combination: an elongated carrier having means at one end for fixedly securing thereto a vibrating motor operating on an axis extending longitudinally of said carrier; means at each end of said carrier adapted to receive a plurality of cables in tensioned condition; a plurality of cables at each end of said carrier in engagement with said cable-receiving means, said cables radiating from said carrier at each end, said sets of cables extending angularly fore and aft respectively from said carrier; support means; means securing the radially extending ends of said cables to said support means in tensioned relation, whereby said carrier may vibrate; and means connected with certain of said cables adapted to place the same under strong tension.

2. A motor mount comprising in combination: a motor carrier having means at one end adapted to support a vibrating motor in fixed relation thereupon; cable retaining means secured exteriorly to opposite end portions of said carrier and having seats faced longitudinally of the carrier and adapted to receive respectively a plurality of cable lengths directed radially outward and fore and aft respectively from said end portions; and bridge means overlying the positions of certain of said cable lengths to receive other of said radially extending cable lengths.

3. A motor mount comprising in combination: a tubular carrier having at one end means for fixedly receiving a vibrating motor thereon; a plurality of non-rigid means connected with each end of said carrier and extending radially upward and outward and also extending somewhat angularly away and from the respective ends of said carrier in the direction of its length for suspending said carrier in a central position; and tensioning means connected with opposite ends of said carrier and extending downwardly to retain said carrier in substantially said central position.

4. A motor mounting adapted for testing airplane engines comprising in combination: an elongated floating tubular carrier; means provided at one end of said carrier for fixedly securing thereto an airplane engine with its longitudinal axis extending longitudinally of said tubular carrier; a plurality of vibration-permitting suspending and positioning cables connected with each of the opposite ends of said tubular carrier, said cables extending respectively fore and aft of said carrier and laterally therefrom in tensioned condition whereby vibratory movement of said motor and its carrier is permitted and substantial lateral and longitudinal movement thereof is prevented; and devices connected with said cables and comprising housings containing cushioning means having positive vibration-absorbing properties.

5. A mounting for testing airplane engines comprising in combination: an engine carrier; a device at one end of said carrier for fixedly securing thereto an airplane engine with its longitudinal axis extending longitudinally of said carrier; at least three flexible vibration-permitting suspending and positioning means connected with each of the opposite ends of said tubular carrier, said means being disposed in tensioned condition to permit vibration of said carrier and said motor, said means extending laterally from the respective ends of said carrier to position said carrier and prevent substantialy lateral movement thereof, said means extending respectively fore and aft from the ends of said carrier to prevent substantial longitudinal movement thereof; cushioning means of limited resilience connected with said positioning means; and means for securing the ends of said positioning means to a support in tensioned condition, whereby said carrier may vibrate.

6. A combination as in claim 5 wherein said securing means includes housings containing a plurality of rubber cushioning blocks alternating with spacers and constituting said cushioning means, said blocks being placed under vibration-absorbing compression.

GERHARD VON MIGULA.

REFERENCES CITED

The following references are of record in the file of this patent:

UNITED STATES PATENTS

| Number | Name | Date |
|---|---|---|
| 1,596,945 | Ranney | Aug. 24, 1926 |
| 1,804,646 | Ryder et al. | May 12, 1931 |
| 2,060,046 | Di Giacomo | Nov. 12, 1936 |
| 2,164,022 | Rowe | June 27, 1939 |
| 2,297,269 | Wendt et al. | Sept. 29, 1942 |
| 2,362,308 | Roberts | Nov. 7, 1944 |
| 2,382,373 | Lord | Aug. 14, 1945 |